United States Patent [19]

Gonda

[11] Patent Number: 5,009,297

[45] Date of Patent: Apr. 23, 1991

[54] ELECTROMAGNETIC CLUTCH HAVING A STRUCTURE FOR REDUCING IMPACT NOISE

[75] Inventor: Hideyuki Gonda, Isesaki, Japan

[73] Assignee: Sanden Corporation, Isesaki, Japan

[21] Appl. No.: 323,961

[22] Filed: Mar. 15, 1989

[30] Foreign Application Priority Data

Mar. 15, 1988 [JP] Japan .............................. 63-33099[U]

[51] Int. Cl.$^5$ ..................... F16D 27/112; F16D 27/14
[52] U.S. Cl. ................................ 192/84 C; 192/30 V; 335/271
[58] Field of Search ................. 192/30 V, 84 C, 84 T, 192/109 R; 335/271, 277

[56] References Cited

U.S. PATENT DOCUMENTS

| 4,694,945 | 9/1987 | Koitabashi | 192/84 C |
| 4,808,870 | 2/1989 | Gonda | 192/84 C X |

FOREIGN PATENT DOCUMENTS

| 53-34045 | 3/1978 | Japan | 192/84 C |
| 51-192631 | 11/1982 | Japan | 192/84 C |
| 58-8997 | 2/1983 | Japan | . |
| 58-72727 | 4/1983 | Japan | 192/84 C |
| 60-18625 | 1/1985 | Japan | 192/84 T |
| 60-220228 | 11/1985 | Japan | 192/84 T |
| 60-252830 | 12/1985 | Japan | 192/84 C |

Primary Examiner—Richard Lorence
Attorney, Agent, or Firm—Banner, Birch, McKie & Beckett

[57] ABSTRACT

An electromagnetic clutch according to the present invention includes a first rotatable member which is rotatably supported on a first bearing. The first rotatable member is connected to an external driving source and has an axial magnetic end plate. A second rotatable member is connected to a driven member. An annular magnetic member is supported on the second rotatable member through a plurality of leaf springs so as to be capable of axial movement and faces the axial end plate of the rotatable member with an axial gap therebetween. A third rotatable member is connected to the second rotatable member to limit the axial movement of the annular magnetic member. An electromagnet is associated with one of rotatable members and the annular magnetic member for transmitting rotational force from the external driving source to the other of the rotatable members by pulling the annular magnetic member into contact with the end plate. A coupling device couples the annular magnetic member to the third rotatable member. An elastic member is disposed between the coupling device and the outer end surface of the third rotatable member for reducing vibration and impact noise at the time of attraction in the axial direction of said annular magnetic member to the magnetic end plate of said first rotatable member.

18 Claims, 3 Drawing Sheets

ELECTROMAGNETIC CLUTCH HAVING A STRUCTURE FOR REDUCING IMPACT NOISE

BACKGROUND OF THE INVENTION

1. Field of The Invention

The present invention generally relates to an electromagnetic clutch, such as for use in controlling the transmission of power from an automobile engine to a refrigerant compressor in an automotive air conditioning system, and, more particularly, to an electromagnetic clutch having a structure for reducing impact noise when an armature plate is attracted to a rotor.

2. Description of The Prior Art

Generally, there are two types of well-known electromagnetic clutches which include a structure to transfer rotational and attractive forces: one type includes a plurality of leaf springs to transfer the forces and the other type includes a plurality of rubber members to transfer the forces. For example, U.S. Pat. No. 4,694,945 discloses a plurality of leaf springs which transfer rotational force from a clutch rotor to an armature plate as the armature plate engages the clutch plate of the clutch rotor. Issued Japanese Utility Model No. 58-8997 discloses a plurality of rubber members which transfer rotational force from the clutch rotor to the armature plate as the armature plate engages the clutch plate of the clutch rotor.

In systems such as that described in above-mentioned U.S. Pat. No. 4,694,945, when the electromagnet associated with the clutch is excited, the armature plate is attracted to one end surface of a rotor against the recoil strength of the leaf springs. As the axial air gap between the armature plate and the rotor is made smaller, the attractive force attracting the armature plate to the rotor increases. Accordingly, the kinetic energy of the armature plate is large just before the armature plate contacts the clutch plate. This kinetic energy of the armature plate is converted to sound energy and vibration as the armature plate contacts the clutch plate. Therefore, when the armature plate is attracted to the rotor, large impact noise and vibration is produced between the armature plate and the rotor. Systems such as that described in the above-mentioned Issued Japanese Utility Model No. 58-8997 reduce this noise and vibration by the use of rubber members. However, the effectiveness and durability of these rubber members is decreased by the rotational stress applied thereto immediately after the armature plate engages the clutch plate.

U.S. Pat. No. 4,808,870 discloses an improved connecting structure between an armature plate and a stopper plate for reducing impact noise when the armature plate is attracted to a rotor. This structure is an improvement over the above-described systems in that impact noise is reduced and the durability of the elastic members is increased. However, in this system, the connecting structure includes an elastic member fixedly secured to an associated pin member. While the elastic member is not subject to rotational force, the absorption of impact noise is accomplished by the elastic member receiving shearing stress produced by the axial movement of the pin member. This shearing stress has a detrimental effect on the durability of the elastic member.

SUMMARY OF THE INVENTION

Accordingly, it is a primary object of this invention to provide an electromagnetic clutch with a structure which can reduce impact noise and vibration when an armature plate is attracted to a rotor.

It is another object of the present invention to provide an electromagnetic clutch with such an arrangement which has high durability.

An electromagnetic clutch according to the present invention includes a first rotatable member which is rotatably supported on a first bearing. The first rotatable member is connected to an external driving source and has an axial magnetic end plate. A second rotatable member is connected to a driven member. An annular magnetic member is supported on the second rotatable member through a plurality of leaf springs so as to be capable of axial movement and faces the axial end plate of the first rotatable member with an axial gap therebetween. A third rotatable member is connected to the second rotatable member to limit the axial movement of the annular magnetic member. An electromagnet is associated with one of rotatable members and the annular magnetic member for transmitting rotational force from the external driving source to the other of the rotatable members by pulling the annular magnetic member into contact with the end plate. A coupling device couples the annular magnetic member to the third rotatable member. An elastic member is disposed between a portion of the coupling device and the outer end surface of the third rotatable member for reducing vibration and impact noise at the time of attraction in the axial direction of said annular magnetic member to the magnetic end plate of said first rotatable member.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENT

Figure 1:
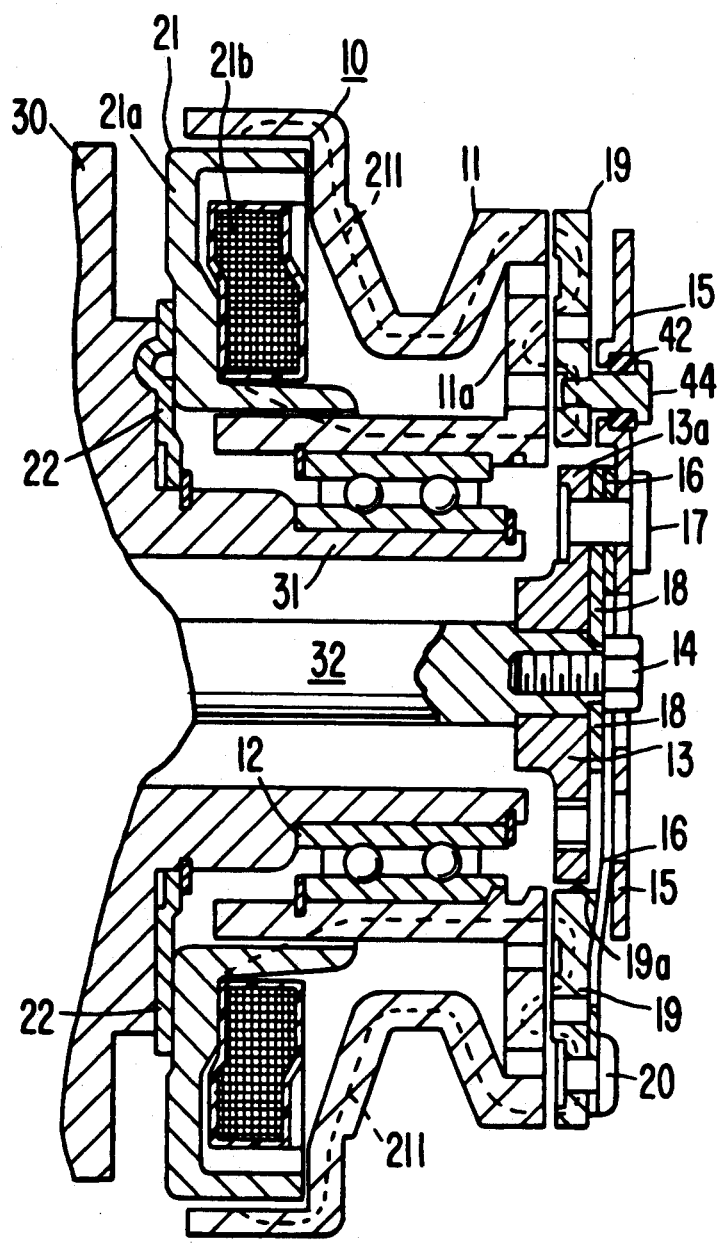
FIG. 1 is a vertical longitudinal section of an electromagnetic clutch in accordance with first embodiment of the present invention.

FIG. 1 illustrates an electromagnetic clutch 10 in accordance with a first embodiment of the present invention. Electromagnetic clutch 10 is disposed on an outer peripheral portion of tubular extension 31 which projects from an end surface of compressor housing 30. Tubular extension 31 surrounds compressor drive shaft 32. Drive shaft 32 is rotatably supported in compressor housing 30 by a bearing (not shown).

Electromagnetic clutch 10 includes clutch rotor 11 which is rotatably supported on tubular extension 31 through ball bearing 12 and which is coupled to an automobile engine (not shown) through a belt (not shown). An outer terminal end of drive shaft 32 extends beyond tubular extension 31 and receives hub 13 which is fixed thereon by bolt 14.

Stopper plate 15 and one end of a plurality of leaf springs 16 are secured by rivets 17 through spacer 18 to an outer surface of flange 13a of hub 13. Specifically, the ends of leaf springs 16 are disposed on spacer 18 such that the ends of leaf springs 16 are confined between the outer surface of flange 13a and the opposed surface of stopper plate 15. Flange 13a and stopper plate 15 are spaced apart by spacer 18 to provide for limited deflection of the ends of leaf springs 16.

The conventional slanted orientation of a plurality of leaf springs connected between an armature plate and a stopper is illustrated in U.S. Pat. No. 4,493,407 to Newton, which is hereby incorporated by reference.

Annular armature plate 19 is provided with a central opening 19a which has a larger diameter than the diameter of flange 13a. Armature plate 19 is adapted to be arranged concentrically with hub 13 with the respective outer surfaces thereof substantially coplanor. The other end of each of leaf springs 16 is fixed to armature plate 19 by rivet 20 to flexibly support armature plate 19 for axial movement upon deflection of leaf springs 16. Armature plate 19 faces the clutch surface of clutch plate 11a and is thus supported with a small radial air gap between armature plate 19 and hub 13 and predetermined axial air gap between armature plate 19 and clutch rotor 11.

Electromagnet 21 includes yoke 21a and coil 21b. Coil 21b is disposed within yoke 21a. Electromagnet 21 is received within an annular hollow portion formed in clutch rotor 11 with a surrounding air gap to generate the magnetic flux 211 which causes armature plate 19 to be attracted to the clutch surface of clutch plate 11a of clutch rotor 11. Yoke 21a of electromagnet 21 is mounted on compressor housing 30 concentrically with drive shaft 32 through support plate 22.

Figure 2:
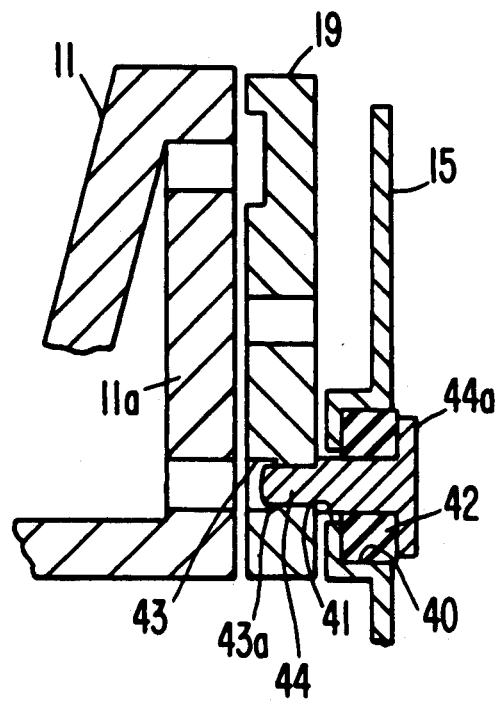
FIG. 2 is an enlarged partial sectional view of the elastic member portion shown in FIG. 1.

FIG. 2 illustrates one of a plurality of equiangularly spaced cup-shaped hollow portions 40 are respectively formed in stopper plate 15. Although three cup-shaped hollow portions are included in a presently preferred embodiment, the invention is not limited in this respect. Opening 41 is formed at the center of the bottom of cup-shaped hollow portion 40. Ring-shaped elastic member 42 is disposed within cup-shaped hollow portion 40. Elastic member 42 may be formed, for example, from rubber. Openings or holes 43, including ridge or step portion 43a, are respectively formed in armature plate 19 to correspond with each opening 41. It will be understood that the number of openings or holes provided in the armature plate varies in accordance with the number of cup-shaped hollow portions. Cylindrical rod 44, including flange portion 44a formed at a forward end (right side in FIG. 2) thereof, is inserted through ring-shaped elastic member 42 and penetrates through opening 41. The terminal end of cylindrical rod 44 is then caulked to form an enlarged tip which contacts ridge 43a of hole 43 and fixedly secures rod 44 such that elastic member 42 is disposed between or sandwiched by flange portion 44a and the bottom of hollow portion 40.

In operation, when electromagnet 21 is excited in response to refrigerating demand, magnetic flux 211 shown in FIG. 1 is produced. Accordingly, armature plate 19 is attracted to clutch plate 11a by electromagnetic force and armature plate 19 engages clutch plate 11a to receive the rotational force of clutch rotor 11. The axial attraction speed of armature plate 19 is reduced by the axial restoring force of elastic member 42. This restoring force is produced by the axial compression of elastic rubber member 42. As a result, the increase of kinetic energy of armature plate 19 is reduced when armature plate 19 is attacted to clutch plate 11a. This reduces impact noise and vibration. Elastic member 42 receives only axial force only since the rotational force is wholly received by leaf springs 16. When electromagnet 21 is demagnetized in response to reduced refrigerating demand, armature plate 19 is detached from clutch plate 11a by the restoring force of both leaf springs 16 and elastic member 42.

As noted, while elastic materials like rubber are durable with respect to compressive stresses, they are not durable with respect to rotational stresses and expansive stresses. In accordance with the present invention, the durability of the elastic members is increased since only compressive forces are applied thereto. In addition, the elastic member is not fixedly secured to cylindrical rod 44, but is maintained within hollow portion 40 by flange 44a. This both simplifies manufacture and eliminates the application of shearing forces and stress to the elastic member thereby further increasing durability.

Figure 3:
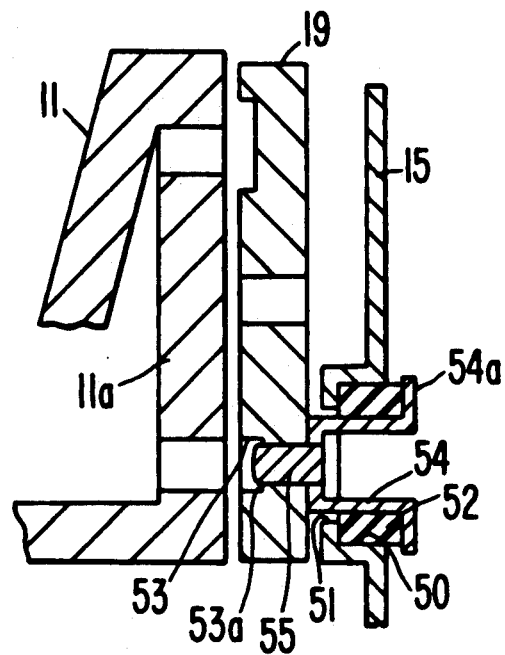
FIG. 3 is an enlarged partial sectional view of an elastic member portion in accordance with second embodiment of the present invention.

FIG. 3 illustrates a second embodiment in accordance with the present invention. In this embodiment, a plurality of equiangularly spaced cup-shaped hollow portions 50 are formed in stopper plate 15. Opening 51 is formed at the bottom of cup-shaped hollow portion 50. Ring-shaped elastic member 52 is disposed within cup-shaped hollow portion 50. A plurality of openings or holes 53, a including ridge 53a, are formed in armature plate 19 to correspond with each opening 51 respectively. Cup-shaped member 54 having a flange portion 54a formed at an open end thereof protrudes through opening 51 such that the bottom of the cup-shaped member is disposed adjacent to armature plate 19. Rivet 55 protrudes through the bottom of cut-shaped member 54 and is fixedly secured at its terminal end (left side in FIG. 3) to ridge 53a by caulking to form an enlarged tip on rivet 55 such that elastic member 52 is sandwiched by flange portion 54a and the bottom of hollow portion 50.

Figure 4:
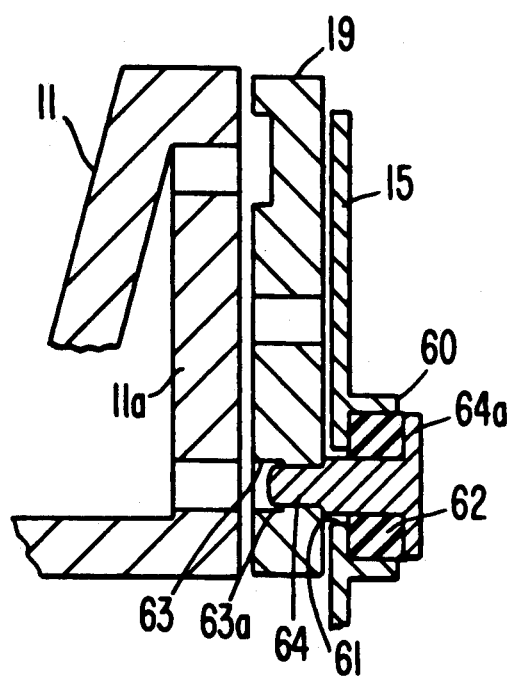
FIG. 4 is an enlarged partial sectional view of an elastic member portion in accordance with third embodiment of the present invention.

FIG. 4 illustrates a third embodiment of the present invention. In this embodiment, a plurality of equiangularly spaced axial annular projections 60 are formed at a forward or outer end surface of stopper plate 15. A plurality of openings 61 are formed in stopper plate 15 to correspond to the center of each axial annular projection 60 respectively. Ring-shaped elastic member 62 is disposed within axial annular projection 60. A plurality of holes 63 including a ridge 63a are formed in armature plate 19 to correspond with each opening 61 respectively. Cylindrical rod 64 including a flange portion 64a formed at a forward end thereof is inserted through the central portion of ring-shaped elastic member 62 and protrudes through opening 61. The rearward or terminal end of cylindrical rod 64 is secured to ridge 63a by caulking to form an enlarged tip on cylindrical rod 64 such that elastic member 62 is sandwiched by flange 64a and stopper plate 15.

The operation of the second and third embodiments to reduce impact noise and vibration is similar to the above-described first embodiment so a detailed explanation is omitted here.

Other variations may be made in the above-described embodiments. For example, the terminal ends of the cylindrical rods or rivets may be secured to the armature plate by providing an internal threaded portion in the armature plate openings and an outer threaded portion on the end of the cylindrical rods or rivets. The rods or rivets may then be screwed into the openings.

This invention has been described in detail in connection with preferred embodiment but his is for illustrative purposes only and the invention is not limited thereto. It will be easily understood by those skilled in the art that variations and modifications can easily be made within the scope of this invention as defined by the appended claims.

I claim:

1. In an electromagnetic clutch including a first rotatable member, said first rotatable member being rotatably supported on a first bearing and having an axial magnetic end plate, a second rotatable member which is rotatably supported, an annular magnetic member connected to said second rotatable member through a plurality of leaf springs so as to be capable of axial movement, said annular magnetic member facing said axial magnetic end plate of said first rotatable member with an axial gap therebetween, a third rotatable member connected to said second rotatable member to limit the axial movement of said annular magnetic member, and electromagnetic means associated with said first rotatable member for attracting said annular magnetic member to said axial magnetic end plate, said leaf springs being arranged to absorb rotational force when said second rotatable member is rotated with said first rotatable member, an improvement comprising:

coupling means for coupling said annular magnetic member to said third rotatable member, said coupling means comprising at least one cylindrical member having a first end including a flange portion which overlays an outer end surface of said third rotatable member and a second end which passes through an opening in said third rotatable member and is fixedly secured to said annular magnetic member; and elastic means disposed between the flange portion of said cylindrical member and the outer end surface of said third rotatable member for reducing vibration and impact noise when said annular magnetic member is attracted to the axial magnetic end plate of said first rotatable member.

2. The electromagnetic clutch according to claim 1 wherein said elastic means is ring-shaped and adapted to receive said cylindrical member therethrough.

3. The electromagnetic clutch according to claim 1 wherein said cylindrical member comprises a cylindrical rod.

4. The electromagnetic clutch according to claim 1 wherein said elastic means comprises rubber.

5. An electromagnetic clutch comprising:
a first rotatable member rotatably supported on a first bearing and having an axial magnetic end plate;
a second rotatable member which is rotatably supported;
an annular magnetic member connected to said second rotatable member through a plurality of leaf springs so as to be capable of axial movement, said annular magnetic member facing said axial magnetic end plate of said first rotatable member with an axial gap therebetween;
a third rotatable member connected to said second rotatable member to limit the axial movement of said annular magnetic member;
electromagnetic means associated with said first rotatable member for attracting said annular magnetic member to said axial magnetic end plate, said leaf springs being arranged to asorb rotational force when said second rotatable member is rotated with said first rotatable member;
coupling means for coupling said annular magnetic member to said third rotatable member, said coupling means comprising at least one cylindrical member having a first end including a flange portion which overlays an outer end surface of said third rotatable member and a second end which passes through an opening in said third rotatable member and is fixedly secured to said annular magnetic member; and
elastic means disposed between the flange portion of said cylindrical member and the outer end surface of said third rotatable member for reducing vibration and impact noise when said annular magnetic member is attracted to the axial magnetic end plate of said first rotatable member.

6. The electromagnetic clutch according to claim 5 wherein said elastic means comprises a ring-shaped elastic member which is adapted to receive said cylindrical member therethrough.

7. The electromagnetic clutch according to claim 6 wherein said third rotatable member includes at least one cup-shaped hollow portion formed in the outer end surface thereof concentric with a respective opening therethrough, said cup-shaped hollow portion receiving said ring-shaped elastic member.

8. The electromagnetic clutch according to claim 6 wherein said third rotatable member includes at least one axial annular projection formed on the outer end surface thereof concentric with a respective opening therethrough, said axial annular projection receiving said ring-shaped elastic member.

9. The electromagnetic clutch according to claim 5 wherein said coupling means comprises three cylindrical members.

10. An electromagnetic clutch comprising:
a first rotatable member rotatably supported on a first bearing and having an axial magnetic end plate;
a second rotatable member which is rotatably supported;
an annular magnetic member connected to said second rotatable member through a plurality of leaf springs so as to be capable of axial movement, said annular magnetic member facing said axial magnetic end plate of said first rotatable member with an axial gap therebetween;
a third rotatable member connected to said second rotatable member to limit the axial movement of said annular magnetic member;
electromagnetic means associated with said first rotatable member for attracting said annular magnetic member to said axial magnetic end plate, said leaf springs being arranged to absorb rotational force when said second rotatable member is rotated with said first rotatable member;
coupling means for coupling said annular magnetic member to said third rotatable member; and
elastic means sandwiched between said coupling means and an outer end surface of said third rotatable member for reducing vibration and impact noise when said annular magnetic member is attracted to said axial magnetic end plate, said elastic means receiving substantially compression forces when said annular magnetic member is attracted to said axial magnetic end plate.

11. The electromagnetic clutch according to claim 10 wherein said coupling means comprises at least one cylindrical member having a first end including a flange portion which overlays an outer end surface of said third rotatable member and a second end which passes through an opening in said third rotatable member and is fixedly secured to said annular magnetic member, said elastic means being sandwiched between the flange of said cylindrical member and the outer end surface of said third rotatable member.

12. The electromagnetic clutch according to claim 11 wherein said elastic means comprises a ring-shaped elastic member which is adapted to receive said cylindrical member therethrough.

13. The electromagnetic clutch according to claim 12 wherein said coupling means comprises three cylindrical members disposed at predetermined positions on said annular magnetic member and said third rotatable member.

14. The electromagnetic clutch according to claim 12 wherein said third rotatable member includes at least one cup-shaped hollow portion formed in the outer end surface thereof concentric with a respective opening therethrough, said cup-shaped hollow portion receiving said ring-shaped elastic member.

15. The electromagnetic clutch according to claim 12 wherein said third rotatable member includes at least one axial annular projection formed on the outer end surface thereof concentric with a respective opening therethrough, said axial annular projection receiving said ring-shaped elastic member.

16. The electromagnetic clutch according to claim 12 wherein said elastic member comprises rubber.

17. The electromagnetic clutch according to claim 10 wherein said coupling means comprises at least one cup-shaped member including a flange portion at an open end thereof and a rivet passing through a first opening in said cup-shaped member and a second opening in said third rotatable member which is fixedly secured to said annular magnetic member.

18. The electromagnetic clutch according to claim 17 wherein said elastic means comprises a ring-shaped elastic member sandwiched between the flange of said cup-shaped member and the outer end surface of said third rotatable member.

* * * * *